(12) United States Patent
Sethi et al.

(10) Patent No.: US 9,271,443 B2
(45) Date of Patent: Mar. 1, 2016

(54) SKID PLATE FOR CROP HEADER HAVING FLEXIBLE CUTTERBAR

(71) Applicant: AGCO Corporation, Duluth, GA (US)

(72) Inventors: Gagan Sethi, Hesston, KS (US);
Christopher Sauerwein, Newton, KS (US); Robert Honas, Newton, KS (US)

(73) Assignee: AGCO Corporation, Duluth, GA (US)

( * ) Notice: Subject to any disclaimer, the term of this patent is extended or adjusted under 35 U.S.C. 154(b) by 40 days.

(21) Appl. No.: 14/369,820

(22) PCT Filed: Dec. 27, 2012

(86) PCT No.: PCT/US2012/071718
§ 371 (c)(1),
(2) Date: Jun. 30, 2014

(87) PCT Pub. No.: WO2013/101875
PCT Pub. Date: Jul. 4, 2013

(65) Prior Publication Data
US 2015/0000240 A1    Jan. 1, 2015

Related U.S. Application Data

(60) Provisional application No. 61/581,009, filed on Dec. 28, 2011.

(51) Int. Cl.
*A01D 43/00* (2006.01)
*A01D 41/14* (2006.01)
*A01D 57/00* (2006.01)

(52) U.S. Cl.
CPC ............... *A01D 41/14* (2013.01); *A01D 57/00* (2013.01)

(58) Field of Classification Search
CPC ..... A01D 41/14; A01D 57/20; A01D 61/002; A01D 34/14; Y10S 56/03
USPC ..................... 56/181, 208, DIG. 10
See application file for complete search history.

(56) References Cited

U.S. PATENT DOCUMENTS

| | | | | | |
|---|---|---|---|---|---|
| 2,102,710 | A | * | 12/1937 | Hume | ........... A01D 57/20 56/158 |
| 3,597,907 | A | * | 8/1971 | Neal | ........... A01D 34/246 56/208 |
| 3,611,681 | A | * | 10/1971 | Blaton et al. | ........... A01D 41/14 56/10.4 |
| 3,747,311 | A | * | 7/1973 | DeCoene | ........... A01D 41/141 56/208 |
| 3,982,384 | A | * | 9/1976 | Rohweder | ........... A01D 45/021 56/106 |

(Continued)

FOREIGN PATENT DOCUMENTS

EP     2 111 741 A1    10/2009
WO    WO 2007/095430 A2    8/2007
WO    WO 2009/136275 A1    11/2009

OTHER PUBLICATIONS

European Patent Office, International Search Report for International Application PCT/US2012/071718, mailed May 4, 2013.

*Primary Examiner* — Árpád Fábián-Kovács

(57) ABSTRACT

A harvesting header includes a header frame, a flexible cutterbar assembly, and a draper assembly. The cutterbar assembly is mounted to the header frame and includes a plurality of skids. Each of the skids has a lower margin configured to engage the ground such that the skids cooperatively cause flexing of the cutterbar assembly along the length thereof in response to changes in terrain as the header is advanced. Each skid presents a skid surface extending from the lower skid margin.

16 Claims, 9 Drawing Sheets

(56) References Cited

U.S. PATENT DOCUMENTS

| | | | | |
|---|---|---|---|---|
| 4,573,308 A * | 3/1986 | Ehrecke | A01D 41/14 | 56/14.4 |
| 4,660,360 A * | 4/1987 | Hardesty | A01D 41/14 | 56/15.8 |
| 4,878,686 A * | 11/1989 | Quaggiotti | A63C 5/00 | 280/15 |
| 5,090,184 A * | 2/1992 | Garter | A01D 46/08 | 56/10.2 E |
| 5,174,101 A * | 12/1992 | Rabitsch | A01D 41/14 | 56/119 |
| 5,713,190 A * | 2/1998 | Vermeulen | A01D 41/141 | 56/10.2 E |
| D423,522 S * | 4/2000 | Huntimer | D15/28 | |
| D454,576 S * | 3/2002 | Huntimer | D15/28 | |
| 7,198,428 B2 * | 4/2007 | Pizzuto | A01B 31/00 | 172/180 |
| 7,222,474 B2 * | 5/2007 | Rayfield | A01D 41/141 | 56/10.2 E |
| 7,478,522 B1 * | 1/2009 | Lovett | A01D 41/14 | 56/296 |
| 7,549,280 B2 * | 6/2009 | Lovett | A01D 61/002 | 56/208 |
| 7,640,720 B1 * | 1/2010 | Lovett | A01D 57/20 | 56/153 |
| 2006/0162311 A1 * | 7/2006 | Talbot | A01D 34/14 | 56/296 |
| 2007/0204584 A1 * | 9/2007 | Coers | A01D 61/002 | 56/15.8 |
| 2007/0204589 A1 * | 9/2007 | Coers | A01D 61/002 | 56/208 |
| 2008/0092508 A1 * | 4/2008 | Talbot | A01D 61/002 | 56/181 |
| 2008/0271426 A1 * | 11/2008 | Lohrentz | A01D 41/14 | 56/153 |
| 2009/0007533 A1 * | 1/2009 | Lovett | A01D 61/002 | 56/14.5 |
| 2009/0266044 A1 * | 10/2009 | Coers | A01D 67/00 | 56/208 |
| 2010/0043375 A1 * | 2/2010 | Schmidt | A01D 41/14 | 56/181 |
| 2012/0043185 A1 * | 2/2012 | Dow | A01D 61/002 | 198/837 |
| 2013/0061569 A1 * | 3/2013 | McClenathen | A01D 34/8355 | 56/52 |
| 2013/0160417 A1 * | 6/2013 | Huseman | A01D 41/14 | 56/181 |

\* cited by examiner

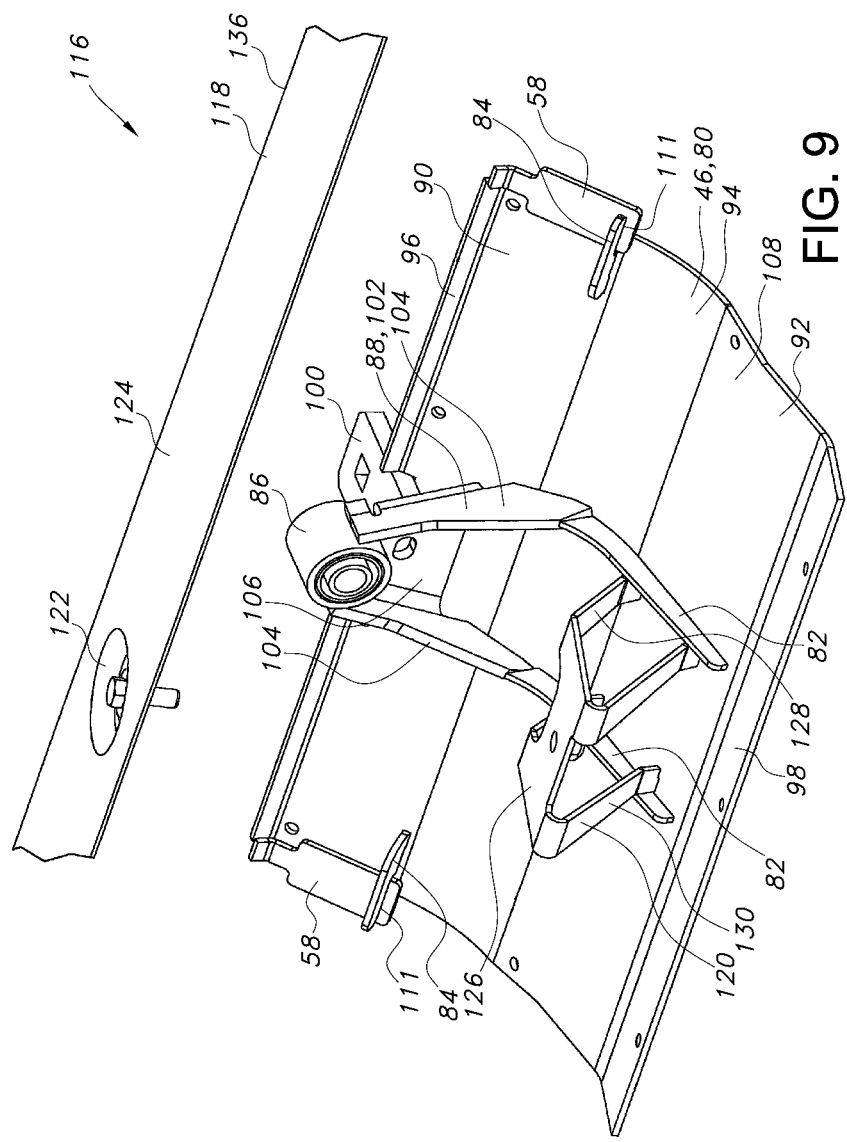

SKID PLATE FOR CROP HEADER HAVING FLEXIBLE CUTTERBAR

CROSS REFERENCE TO RELATED APPLICATIONS

This application claims priority to U.S. Provisional Application No. 61/581,009 filed Dec. 28, 2011, entitled "SKID PLATE FOR CROP HEADER HAVING FLEXIBLE CUTTERBAR".

BACKGROUND OF THE INVENTION

1. Field of Invention

This invention relates generally to a harvesting header. More specifically, embodiments of the present invention concern a harvesting header with a flexible cutterbar and a draper conveyor.

2. Description of Related Art

A traditional grain harvesting implement or machine, such as a self-propelled combine, is used to harvest a variety of grains, such as wheat, soybeans, and rice. Combines typically include a harvesting header that cuts the crop and gathers the crop material into a feeder house for threshing and other operations. For some grains, such as wheat, the sickle of the header can be spaced from the ground during the cutting operation. For other grains, the sickle must be positioned close to the ground, often with the header in sliding contact with the ground, in order to collect most of the grain. Flexible headers are used to follow the natural contours of the field while cutting the grain.

Turning to FIGS. 1-4, a prior art harvesting header H is depicted and includes a header frame F, with draper arm assemblies DA and end tilt arm assemblies E pivotally secured to the frame F. The assemblies DA and E support cutterbar assembly C. The cutterbar assembly C includes a flexible cutterbar B and skids S carried on the forward ends of the assemblies DA and E. The cutterbar assembly C is constructed to present a cutter height CH and a skid angle SA. The header H also broadly includes a draper assembly A with side drapers SD and center draper CD. The header H includes a lower belt support assembly L. Additional details of the prior art header are disclosed in U.S. Pat. No. 7,836,671, issued Nov. 23, 2010, entitled FLEXIBLE DRAPER AND CUTTER BAR WITH TILT ARM FOR CUTTERBAR DRIVE, which is hereby incorporated in its entirety by reference herein.

Prior art crop harvesting headers suffer from various limitations. For example, it has been found that the illustrated header H tends to become clogged with crop residue in ways that adversely affect header operation. For instance, the area below the leading edge of side drapers SD and above the belt support assembly L tends to collect crop residue from the drapers until the crop residue interferes with smooth draper belt movement. This residue can also migrate into the area between the belt runs, which is problematic. In particular, such excessive residue collection can cause binding of the belt and can restrict belt rotation.

SUMMARY OF THE INVENTION

The following brief summary is provided to indicate the nature of the subject matter disclosed herein. While certain aspects of the present invention are described below, the summary is not intended to limit the scope of the present invention.

Embodiments of the present invention provide a harvesting header that does not suffer from the problems and limitations of the prior art harvesting header set forth above.

A first aspect of the present invention concerns a harvesting header operable to harvest crop. The harvesting header broadly includes a header frame, a flexible cutterbar assembly, and a draper assembly. The flexible cutterbar assembly is mounted to the header frame to extend lengthwise in a lateral direction relative to the normal direction of travel of the header. The cutterbar assembly includes a plurality of skids, each of which has a lower skid margin configured to engage the ground such that the skids cooperatively cause flexing of the cutterbar assembly along the length thereof in response to changes in terrain as the header is advanced. The draper assembly includes an endless draper belt configured to receive severed crop materials from the cutterbar assembly and convey the materials laterally. Each of the skids presents a skid surface that projects from the lower skid margin at a ground angle measured relative to the normal direction of travel, with the ground angle dimension ranging from about six degrees to about ten degrees.

A second aspect of the present invention concerns a harvesting header operable to harvest crop. The harvesting header broadly includes a header frame, a flexible cutterbar assembly, and a draper assembly. The flexible cutterbar assembly is mounted to the header frame to extend lengthwise in a lateral direction relative to the normal direction of travel of the header. The cutterbar assembly includes a plurality of skids and a flexible cutterbar supported on each of the skids at a support location. Each of the skids has a lower skid margin configured to engage the ground such that the skids cooperatively cause flexing of the cutterbar assembly along the length thereof in response to changes in terrain as the header is advanced. The draper assembly includes an endless draper belt configured to receive severed crop materials from the cutterbar assembly and convey the materials laterally. Each of the skids presents a skid surface that extends forwardly and upwardly from the lower skid margin to position the support location at a vertical skid dimension above the ground when the lower skid margin engages the ground. The skid presents a longitudinal skid dimension measured in a fore-and-aft direction between the support location and the lower skid margin, wherein the fore-and-aft direction is generally perpendicular to the vertical skid dimension. The skid is configured so that a ratio of vertical skid dimension to longitudinal skid dimension ranges from about 1:2 to about 1:1.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 1:
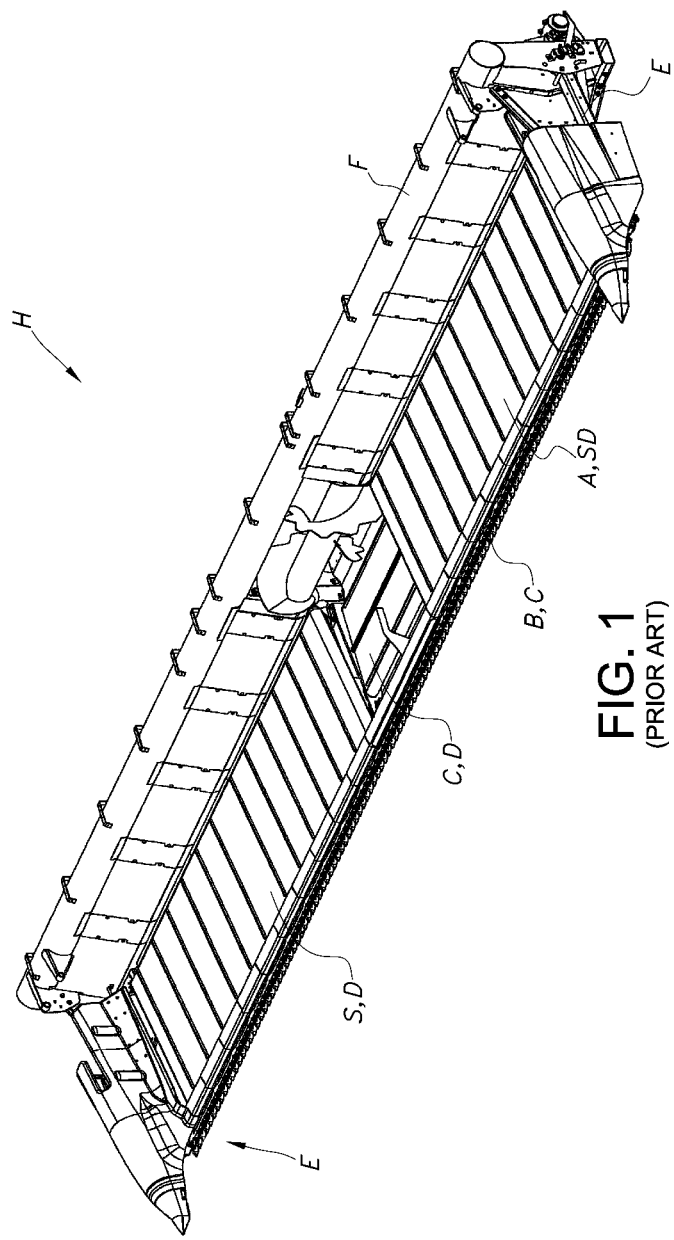
FIG. 1 is a front perspective of a prior art harvesting header.
Figure 2:
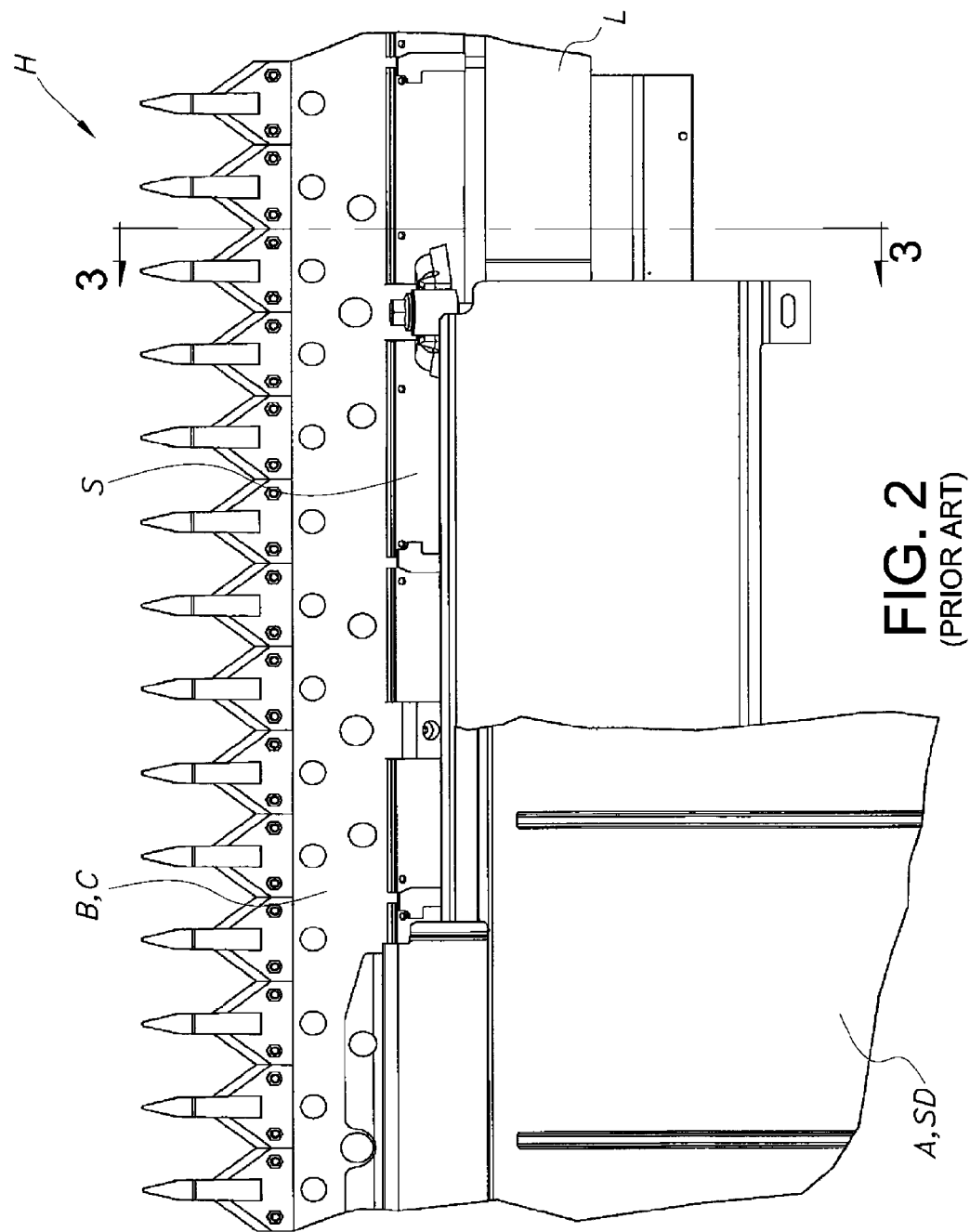
FIG. 2 is a fragmentary top view of the prior art harvesting header shown in FIG. 1, showing the cutterbar assembly and side draper.
Figure 3:
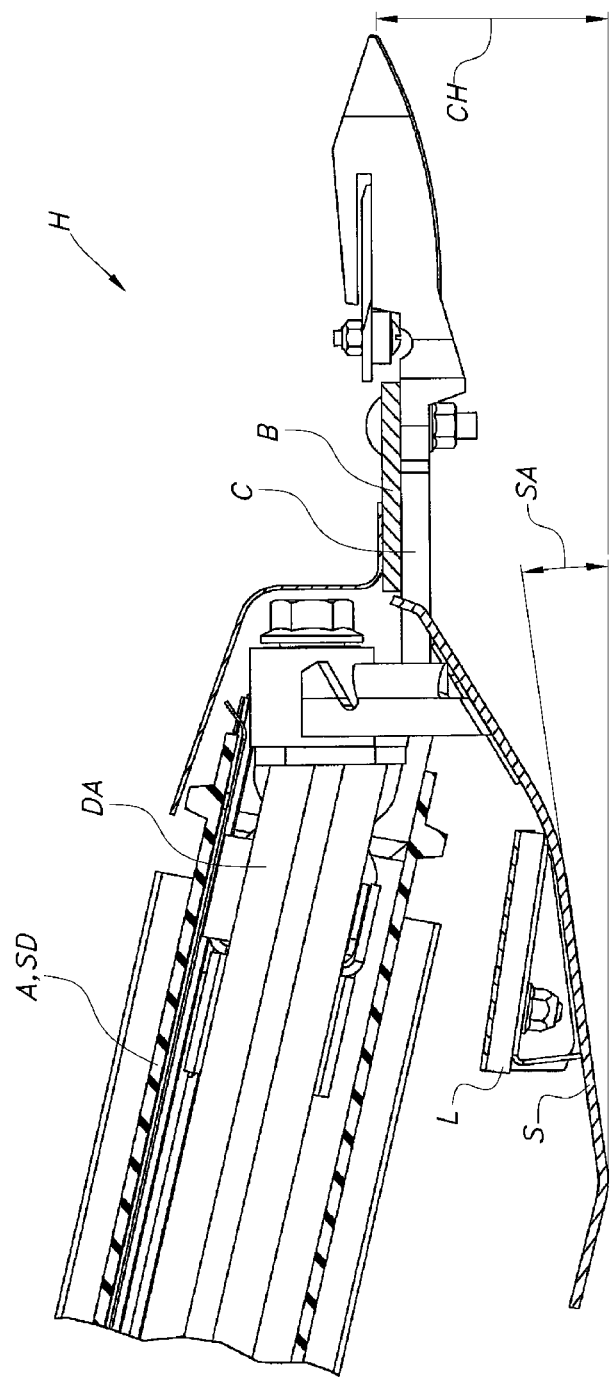
FIG. 3 is a fragmentary side elevation of the prior art harvesting header shown in FIGS. 1 and 2, with the header being cross-sectioned to show the side draper and cutterbar assembly.
Figure 4:
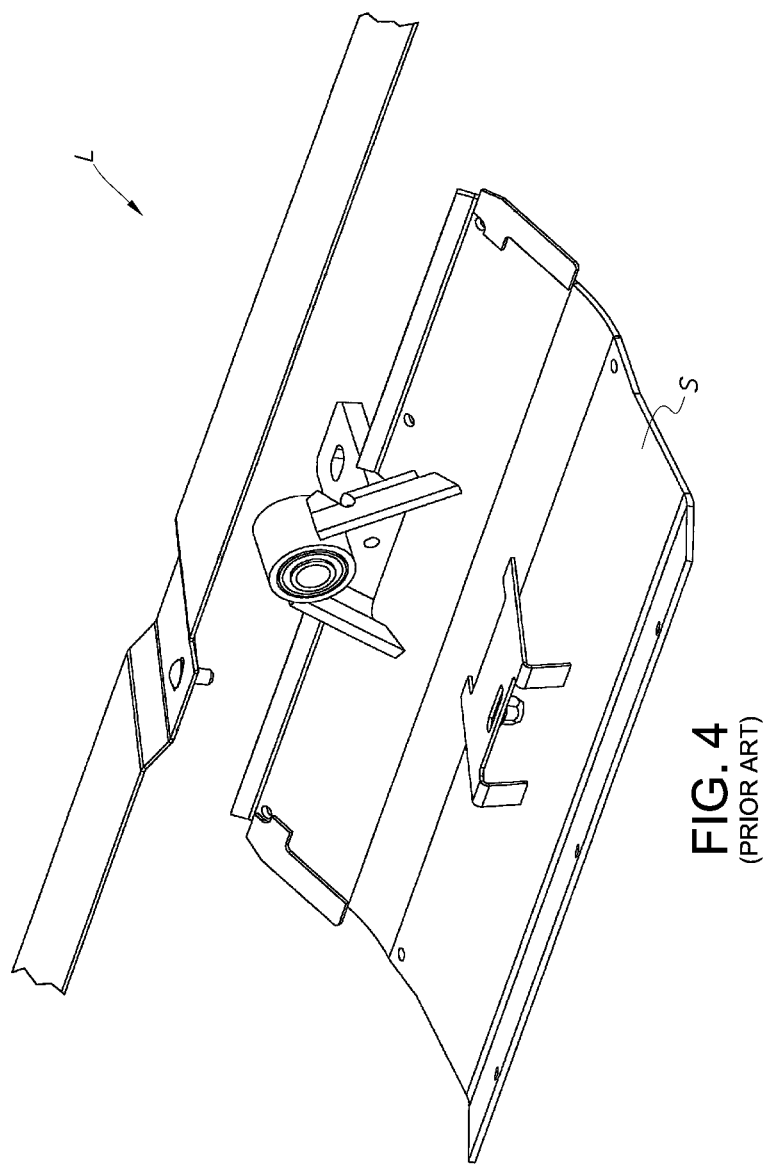
FIG. 4 is a fragmentary rear perspective of the prior art harvesting header shown in FIGS. 1-3, showing a skid of the cutterbar assembly and a belt support panel.
Figure 5:
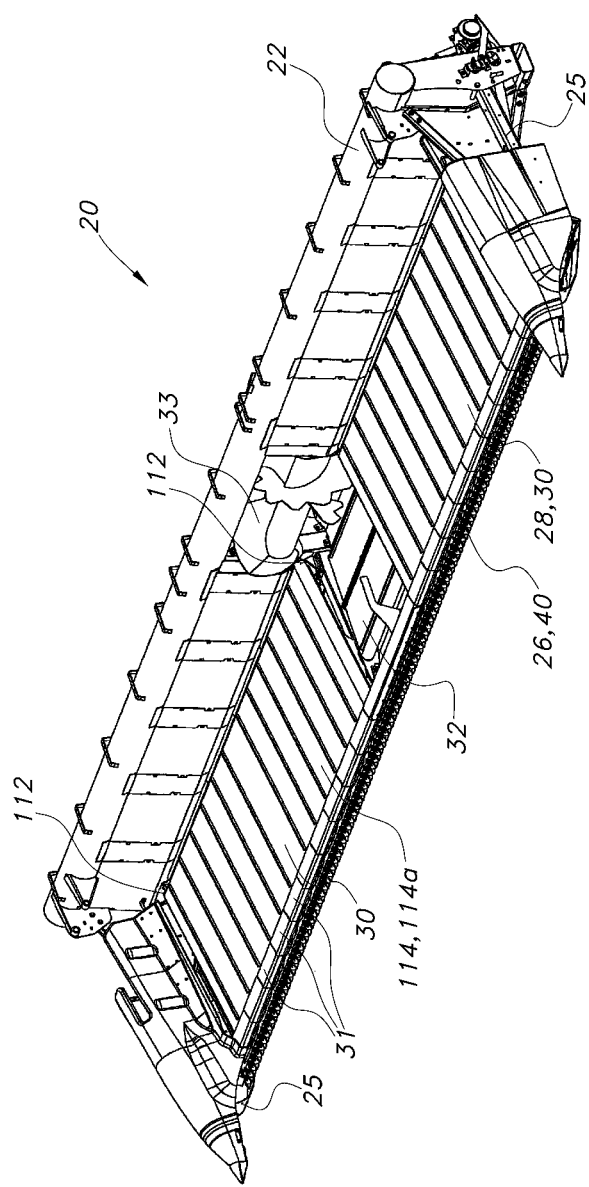
FIG. 5 is a front perspective of a harvesting header constructed in accordance with a preferred embodiment of the present invention, with the header including a header frame, draper arm assemblies, end tilt arm assemblies, a cutterbar assembly, a draper assembly, and a belt guard assembly.
Figure 6:
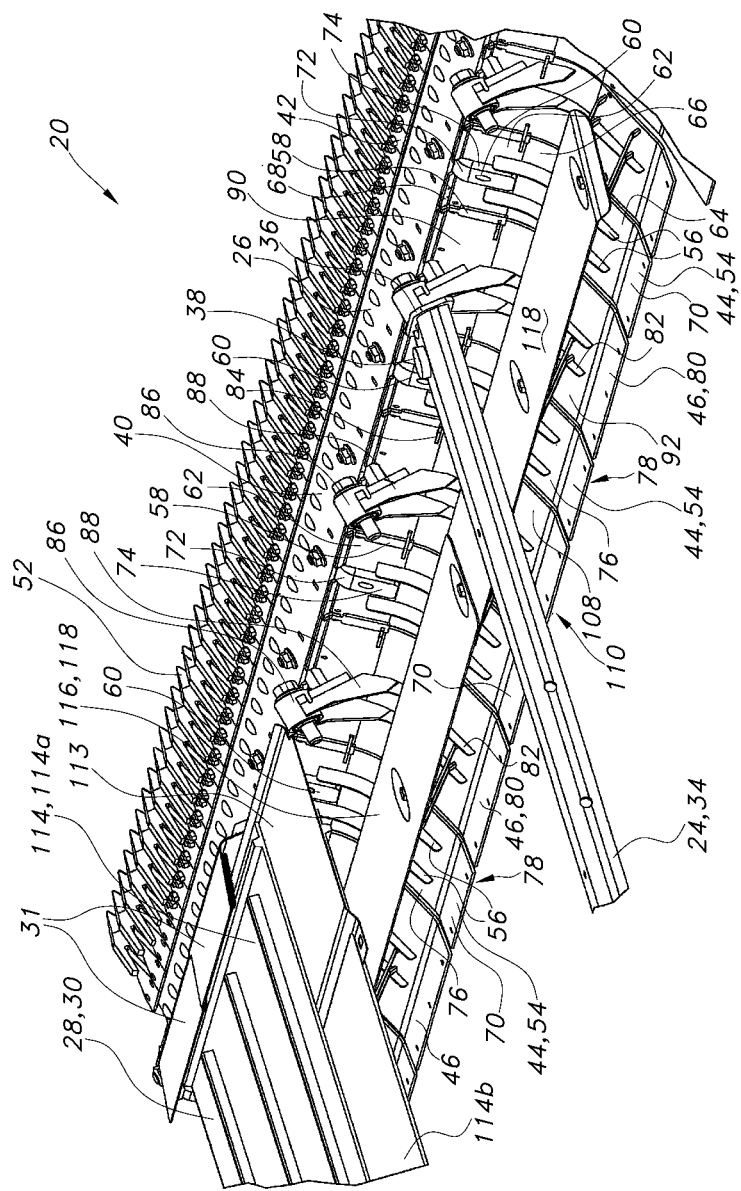
FIG. 6 is a fragmentary rear perspective of the harvesting header shown in FIG. 5, with multiple draper arm assemblies and belt guards being removed and portions of the draper belt and upper run support panels removed to depict the lower belt run support assembly and the cutterbar assembly.
Figure 7:
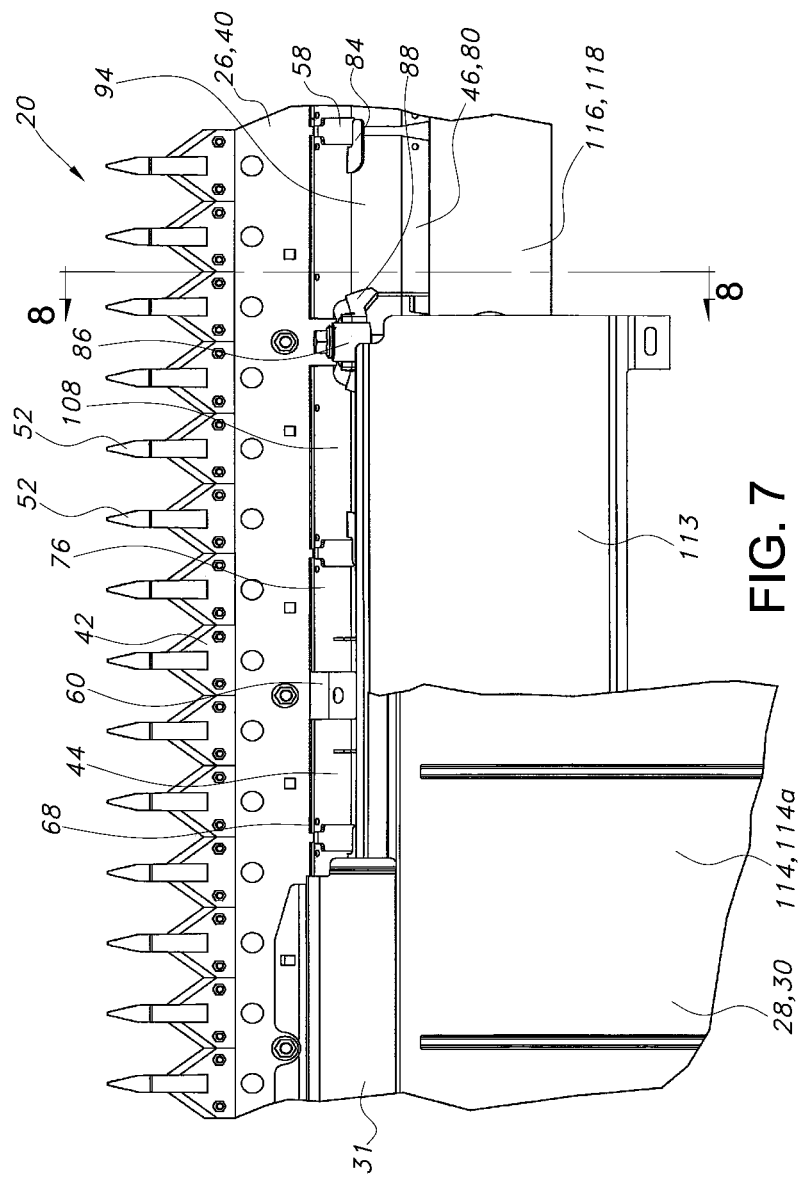
FIG. 7 is a fragmentary top view of the harvesting header shown in FIGS. 5 and 6, with belt guards being removed and portions of the draper belt and upper run support panels being removed to show the upper and lower run support panels positioned relative to the cutterbar assembly.
Figure 8:
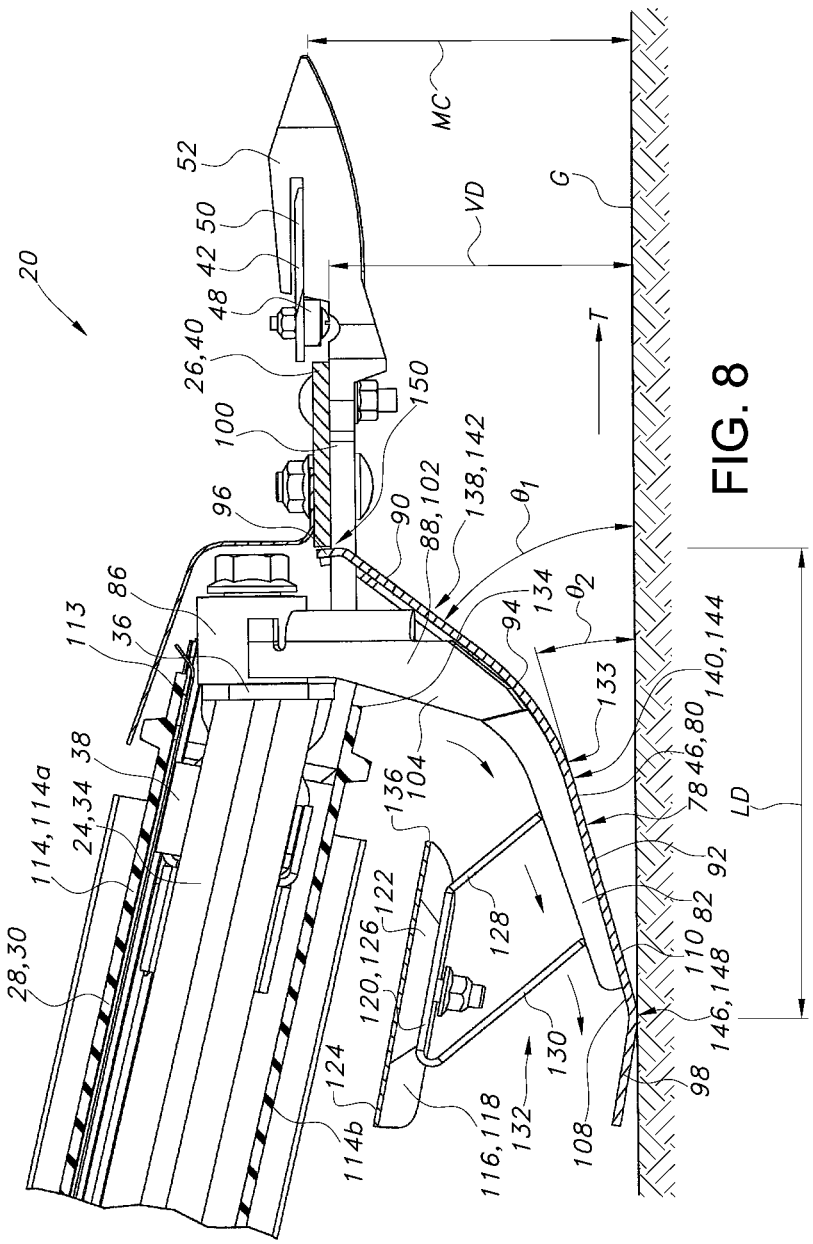

FIG. 8 is a fragmentary side elevation of the harvesting header shown in FIGS. 5-7, showing the cutterbar assembly and draper assembly cross sectioned to show a skid of the cutterbar assembly with the lower run support assembly mounted thereto, with the lower run support assembly and skid cooperatively defining a residue opening that permits crop residue to pass from the draper belt along the skid; and FIG. 9 is a fragmentary rear perspective of the harvesting header shown in FIGS. 5-8, showing the skid of the cutterbar assembly and a lower run support panel exploded from a platform of the lower run support assembly.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 5 and 6, a harvesting header 20 is operable to be used with a powered combine (not shown) to harvest various crops. In particular, the header 20 is operable to sever crop in close proximity to the ground surface and to collect the severed crop material. At the same time, it has been found that the illustrated header 20 operates without accumulating harmful amounts of crop residue at critical locations in the header mechanism, particularly along the draper belts.

The harvesting header 20 broadly includes a header frame 22 (similar to header frame F), draper arm assemblies 24, end tilt arm assemblies 25 (similar to end tilt arm assembly E), a cutterbar assembly 26, a draper assembly 28, which includes side drapers 30 and center draper 32, and a belt guard assembly including a plurality of belt guards 31. The header 20 also includes a central collecting auger 33 and a reel (not shown) that extends the length of the header frame 22 and is operable to direct upstanding crop into the header 20. The illustrated cutterbar assembly 26 and draper assembly 28 are preferably flexible so that the header 20 is configured to closely follow an undulating ground contour. However, there are aspects of the present invention where one, more or all of the drapers could be substantially inflexible relative to the header frame 22.

With respect to the header frame 22, draper arm assemblies 24, end tilt arm assemblies 25, center draper 32, and belt guards 31, additional preferred features of these components are disclosed in the above-incorporated '671 patent.

Turning to FIGS. 5-8, the draper arm assemblies 24 preferably include pivot arms 34 that are spaced laterally along and pivotally mounted to the header frame 22 for pivotal movement about a lateral pivot arm axis. The pivot arms 34 extend along the fore-and-aft direction to present a front end 36, with a spacer 38 being mounted on top of the pivot arm 34 adjacent the front end 36. As will be discussed, each of the pivot arms 34 is attached to a corresponding skid.

The cutterbar assembly 26 preferably includes a cutterbar 40, sickle assembly 42, and skids 44,46. The illustrated cutterbar 40 comprises a unitary, flexible metal strip and extends laterally along the length of the header. The cutterbar 40 is attached to and supports the sickle assembly 42.

The sickle assembly 42 comprises a split sickle that includes a pair of flexible sickle bars 48 and knives 50 that are attached to and spaced along the length of the flexible sickle bars 48. The sickle assembly 42 also includes knife guards 52 attached to the cutterbar 40, with the sickle bars 48 and knives 50 being operable to slide in a reciprocating manner relative to the cutterbar 40 and flex with the cutterbar 40. The sickle bars 48 preferably reciprocate in opposite directions relative to one another. However, it is within the scope of the present invention for the cutterbar assembly 26 to include a single continuous sickle bar. Additional features of the sickle assembly 42 and the sickle drive mechanism are disclosed in the above-incorporated '671 patent.

The skids 44,46 are configured to slide along the ground G and thereby support the cutterbar 40 so that the cutterbar assembly 26 can travel in close proximity to the ground surface. The skids 44 each preferably include a skid plate 54, a pair of reinforcing ribs 56, end connectors 58, and a central bracket 60. The skid plate 54 preferably includes a cutterbar-supporting forward section 62 and a ground-engaging aft section 64 (see FIG. 6). The sections 62,64 are preferably formed as part of a unitary plate structure, with the sections 62,64 being joined along a laterally extending bend 66. However, it is also within the scope of the present invention where the sections 62,64 comprise separate plate elements that are fastened together. Preferably, the sections 62,64 are arranged so that the forward section 62 presents a skid angle θ1 relative to a normal direction of travel T along the ground and the aft section 64 presents a ground angle θ2 relative to the normal direction of travel T, where angle θ1 is greater than angle θ2 (see FIG. 8). The skid plate 54 also includes an upright section 68 that is attached to and angled relative to the forward section 62 (see FIG. 6). The skid plate 54 further includes a rearward-most section 70 that is attached to and angled relative to the aft section 64. For some aspects of the present invention, the skid plate 54 could be alternatively configured without departing from the scope of the present invention.

The bracket 60 is elongated and unitary and presents forward and aft portions 72,74 that are angled relative to one another. The aft portion 74 is attached to the forward section 62 of the skid plate 54 and the forward portion 72 is attached to the cutterbar 40. Thus, the bracket 60 preferably interconnects the skid plate 54 and cutterbar 40 so that the skid plate 54 presents upper and lower surfaces 76,78.

The ribs 56 are also elongated and unitary and present fore and aft ends, with the ribs 56 presenting a height dimension that varies along the length of the rib 56. The ribs 56 are attached to the upper surface 76 of the skid plate 54 along a lower edge of the ribs. Thus, the ribs 56 serve to restrict flexing between the forward and aft sections 62,64. Preferably, the ribs 56 are welded to the skid plate 54, but could be attached thereto by other suitable means, e.g., where the ribs 56 are attached with fasteners.

Turning to FIGS. 6, 8, and 9, the skids 46 each preferably include a skid plate 80, a pair of reinforcing ribs 82, end connectors 84, a bearing 86, and a central bracket 88. Similar to skid plate 54, the skid plate 80 preferably includes a cutterbar-supporting forward section 90 and a ground-engaging aft section 92. The sections 90,92 are preferably formed as part of a unitary plate structure, with the sections 90,92 being joined along a laterally extending bend 94. However, it is also within the scope of the present invention where the sections 90,92 comprise separate plate elements that are fastened together. Preferably, the sections 90,92 are arranged so that the forward section 90 presents the angle θ1 relative to the ground G and the aft section 92 presents the angle θ2 relative to the ground G. The skid plate 80 also includes an upright section 96 that is attached to and angled relative to the forward section 90. The skid plate 80 further includes a rearwardmost section 98 that is attached to and angled relative to the aft section 92.

The bracket 88 is elongated and unitary and presents forward and aft portions 100,102 that are attached to one another. The aft portion 102 includes upright sides 104 and a central web 106 that extends laterally between and interconnects the sides 104. The forward portion 100 is attached to and projects forwardly of the central web 106 along a fore-and-aft direction.

The bracket 88 preferably interconnects the skid plate 80 and cutterbar 40 so that the skid plate 80 presents upper and lower surfaces 108,110. In particular, the forward portion 100 is preferably attached to the cutterbar 40 with conventional fasteners.

The ribs 82 are also elongated and unitary and present fore and aft ends, with the ribs 82 presenting a height dimension that varies along the length of the rib 82. The ribs 82 are attached to the upper surface 108 of the skid plate 80 along a lower edge of the ribs. Preferably, the ribs 82 are welded to the skid plate 80, but could be attached thereto by other suitable means, e.g., where the ribs 82 are attached with fasteners. As will be discussed in greater detail, the skids 44,46 have a preferred shape and configuration, particularly with regard to the lower surface 110, to permit the header to travel closely along the ground while passing over and/or through crop residue.

The illustrated skids 44,46 are preferably positioned in an alternating arrangement where each pair of adjacent skids 44 has a skid 46 located therebetween and each pair of adjacent skids 46 has a skid 44 located therebetween. The skids 44,46 are shiftably interconnected by slidably positioning each end connector 58 in a corresponding slot 111 formed by the skid plate 80 and the respective end connector 84 (see FIG. 9). Thus, each pair of engaged connectors 58,84 cooperatively form a joint that preferably permits relative sliding movement and relative pivotal movement between the corresponding adjacent skids.

The skids 44,46 are preferably attached to and move with the draper arm assemblies 24. In particular, the skids 46 are each preferably attached to a corresponding pivot arm 34 by attaching the bearing 86 to the front end 36 with a bolt. In this manner, the skid 46 is pivotally mounted to the pivot arm 34 so as to be pivotal relative to the pivot arm 34 about a longitudinal arm axis. Thus, the pivot arms 34 also serve to support the skids 44 and the cutterbar assembly 26. As will be discussed further, the skids 44,46 have a preferred position and orientation relative to the cutterbar assembly 26 to permit the header to travel closely along the ground while passing over and/or through crop residue.

Again, the draper assembly 24 preferably includes side drapers 30 and center draper 32. Each side draper 30 broadly includes oppositely spaced inboard and outboard rollers 112, front and rear upper run support panels 113, a side draper belt 114, and a belt tensioning mechanism (not shown).

Each of the rollers 112 is rotatably mounted to a corresponding draper arm assembly 24. The rollers 112 are preferably mounted so as to pivot with the respective draper arm assemblies 24 about the lateral arm pivot axis. Additional features of a side draper with an exemplary arrangement of draper belt rollers is disclosed in U.S. Pat. No. 7,971,419, issued Jul. 5, 2011, entitled DRAPER BELT SUPPORT PANELS FOR FLEXIBLE DRAPER HEADER.

Turning to FIGS. 7-9, the upper run support panels 113 are preferably elongated metal strips that extend laterally between the rollers 112. The upper run support panels 113 are cooperatively supported by respective draper arm assemblies 24 and serve to evenly support the weight of the side draper belt 114 and any severed crop material on the side draper belt 114. The illustrated side draper belt 114 is a substantially endless belt that is particularly configured for conveying the severed crop material toward the center draper. The side draper belt 114 is rotatably mounted to surround the respective rollers 112 and the corresponding draper arm assemblies 24. The leading edge of the draper belt 114 is covered by belt guards 31, with the belt guards 31 extending from the cutterbar assembly 26 to a location adjacent the leading edge.

The side draper belt 114 presents opposite endmost margins defined by the rollers 112. Furthermore, the side draper belt 114 presents upper and lower runs 114a,b, with the upper run 114a extending over the upper run support panels 113 so that the panels 113 restrict the upper run 114a from sagging. The lower run 114b of the side draper belt 114 extends below the panels 113. The outboard roller 112 is powered by a drive (not shown), with the outboard roller 112 driving the side draper belt 114 so that the upper run 114a of the side draper belt 114 moves inwardly toward the center draper. While the illustrated embodiment includes left and right side drapers 30 separated by a center draper, it is within the scope of the present invention, for at least some aspects of the present invention, where an alternative conveyor mechanism is used. For instance, multiple end-to-end side drapers could be used to convey crop material.

The header 20 also includes a lower run support assembly 116 associated with each side draper. Each lower run support assembly 116 is operable to support the lower run 114b when part of the lower run 114b sags from the tensioned belt condition as depicted (i.e., the lower run is not depicted as sagging). It will be appreciated that the tensioned draper belt 114 loses tension over time. Thus, as the belt loses tension, a central portion of the lower run 114b can sag below the depicted position of the lower run 114b. As the lower run sags, the lower run support assembly 116 is operable to engage the sagging belt run.

The lower run support assembly 116 preferably includes lower run support panels 118 and platforms 120. The panels 118 each include an elongated metal strip that extends between opposite ends thereof. The panels 118 each present standoffs 122 formed in the metal strip and spaced along the length of the strip. The panels 118 also present an upper support surface 124.

The illustrated panels 118 are preferably arranged in a general end-to-end overlapping relationship (see FIG. 6). In this manner, the panels 118 preferably extend continuously from a location adjacent the inboard roller 112 to a location adjacent the outboard roller 112. However, for some aspects of the present invention, the lower run support assembly 116 could present one or more locations between the rollers where the lower run 114b is not supported by a panel 118. The panels 118 are preferably spaced entirely rearwardly of the belt guards 31. Furthermore, the panels 118 are preferably spaced entirely rearwardly of the leading edge of the draper belt 114 so that any crop residue from the draper belt 114 is restricted from falling onto the panels 118.

Preferably, platforms 120 are used to position and support the panels 118 below the lower run 114b and over the skids 44,46. Each platform 120 preferably includes a top 126, forward legs 128, and aft legs 130, with the legs 128,130 being attached to and depending from the top 126.

In the illustrated embodiment, the platform 120 is attached to a corresponding skid 46. In particular, the lower ends of legs 128,130 are preferably attached to the aft section 92 so that the legs 128,130 project upwardly and rearwardly from the aft section 92. Furthermore, the platform 120 is preferably positioned laterally between a corresponding pair of ribs 82.

The panels 118 are attached to corresponding platforms 120 with removable fasteners. Thus, the panels 118 are preferably mounted to and supported by respective skids 46. Furthermore, as the cutterbar 40 and skids move with the terrain as the header is advanced, the panels 118 generally move and flex with the skids 46. However, it is within the ambit of the present invention where the illustrated panels 118 are mounted so as to be supported by structure other than skids 46. For instance, structure other than pivot arms 34 could be mounted to the header frame 22 to extend forwardly to support the panels 118 above the ground.

The panels 118 are preferably positioned so that the panels 118 and skids 44,46 cooperatively present a residue opening 132 therebetween. The residue opening 132 extends from an entrance 133 adjacent a forward edge 134 of the lower run 114b and generally below the panels 118 to a location adjacent the rearwardmost sections 70,98 (see FIG. 8). The illustrated opening 132 is preferably configured so that any crop residue falling onto the skids 44,46 is allowed to pass rearwardly along the upper surfaces 76,108 of the skids (as indicated by the arrows in FIG. 8) and beyond the rearwardmost sections 70,98.

The panels 118 are preferably positioned so that a forward margin 136 of the panels 118 is spaced rearwardly from the upright sections 68,96 of the skids to define a longitudinal panel spacing dimension (measured in a fore-and-aft direction). The longitudinal panel spacing dimension is preferably in the range of about three (3) to seven (7) inches. Most preferably, the longitudinal panel spacing dimension is about five (5) inches.

The panels 118 are also preferably mounted relative to the skids so that the opening 132 has a minimum cross-sectional dimension measured between the panel 118 and the skid. The minimum cross-sectional dimension preferably ranges from about one (1) inch to about four (4) inches. More preferably, the minimum cross-sectional dimension is about two (2) inches.

Turning to FIG. 8, the skids 44,46 preferably have the illustrated configuration so that the illustrated header 20 moves efficiently through crop materials along the ground. As discussed, the skids 44 include forward and aft sections 62,64, and skids 46 include forward and aft sections 90,92. Each section 62,64 presents respective forward and aft portions 138,140 of the lower surface 78 (see FIG. 8). Similarly, each section 90,92 presents respective forward and aft portions 142,144 of the lower surface 110.

The skids 44,46 also present respective lower margins 146,148, with the aft portions 140,144 projecting forwardly and upwardly from the respective lower margins 146,148 (see FIG. 8). As will be appreciated, the skids 44,46 are preferably configured and positioned so that the skids 44,46 engage the ground along the lower margins 146,148. As the lower margins 146,148 engage the ground, the skids 44,46 cause flexing of the cutterbar assembly 26 along the length thereof in response to changes in terrain as the header is advanced.

In the illustrated embodiment, the skids 44,46 are positioned with respect to the cutterbar allow the header 20 to move efficiently through and/or over crop materials along the ground. Preferably, with the lower margins 146,148 engaging the ground, the skids 44,46 position the cutterbar 40 so that the header 20 presents a minimum cutter distance MC that ranges from about thirty (30) millimeters to about one hundred twenty-four (124) millimeters. More preferably, the minimum cutter distance MC ranges from about sixty (60) millimeters to about ninety (90) millimeters.

Furthermore, the aft portions 140,144 preferably extend relative to the normal direction of travel T at ground angle $\theta 2$ (see FIG. 8). The ground angle $\theta 2$ preferably ranges from about two (2) degrees to about fourteen (14) degrees and, more preferably, ranges from about six (6) degrees to about ten (10) degrees.

The forward portions 138,142 preferably extend relative to the normal direction of travel T at skid angle $\theta 1$ (see FIG. 8). The skid angle $\theta 1$ is preferably greater than the ground angle $\theta 2$. More preferably, the difference between the skid angle $\theta 1$ and the ground angle $\theta 2$ ranges from about thirty (30) degrees to about forty (40) degrees.

The skids 44,46 also each present a longitudinal skid dimension LD measured in a fore-and-aft direction between a support location 150 where the cutterbar 40 is supported on each skid and a vertical skid dimension VD measured generally perpendicular to the fore-and-aft direction. Preferably, the skids 44,46 are configured so that a ratio of vertical skid dimension to longitudinal skid dimension ranges from about 1:2 to about 1:1. Most preferably, the ratio is about 1:1.75. Further, it is noted that the dimension LD is in the range of about four (4) inches to about eight (8) inches, and is most preferably about six (6) inches. The dimension VD is preferably in the range of about two (2) inches to about six (6) inches, and is most preferably about four (4) inches.

In use, the illustrated header 20 can be advanced along and in contact with the ground without pushing an undue amount of crop residue on the ground. In particular, the skids 44,46 are configured and positioned to hold the cutterbar at a location above the ground so that the sickle assembly is restricted from engaging and pushing crop residue on the ground. For instance, as the header 20 travels along the ground and approaches crop residue, the skids engage and ride over the residue with the cutterbar being shifted up and over the residue. Alternatively, the illustrated cutterbar assembly can, in some instances move through the residue while maintaining the cutterbar at an elevated location so that pushing of residue by the header 20 is restricted.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A harvesting header operable to harvest crop, said harvesting header comprising:
a header frame;
a flexible cutterbar assembly mounted to the header frame to extend lengthwise in a lateral direction relative to the normal direction of travel of the header,
said cutterbar assembly including a plurality of skids, each of which has a lower skid margin configured to engage the ground such that the skids cooperatively cause flexing of the cutterbar assembly along the length thereof in response to changes in terrain as the header is advanced,
each of said skids presenting a skid surface comprising an aft portion that projects from the lower skid margin at a ground angle measured relative to the normal direction of travel, with the ground angle dimension ranging from about six degrees to about ten degrees, wherein said skid surface also comprises a forward portion that projects forwardly of the aft portion, said forward portion extending at a skid angle measured relative to the normal direction of travel, with the skid angle being different than the ground angle; and
a draper assembly including an endless draper belt configured to receive severed crop materials from the cutterbar assembly and convey the materials laterally, wherein said draper belt comprises an upper run and a lower run below said upper run; and
a lower run support assembly located below the lower run of the draper belt and at least partly over a portion of the plurality of skids, said lower run support assembly including a plurality of run support panels extending laterally along the lower run and a plurality of lower run support platforms supporting the plurality of run support panels, each run support platform being attached to a corresponding one of said plurality of skids, wherein said run support panels spaced from the plurality of skids on the run support platforms to define a residue opening therebetween through which any crop residue falling onto the plurality of skids is permitted to pass, the residue opening extending from an entrance adjacent a forward edge of the lower run and below the run support panels to a location adjacent the aft portion of said plurality of skids.

2. The harvesting header as claimed in claim 1, said cutterbar assembly including a flexible cutterbar supported on the skids, said forward and aft portions of the skid surface cooperating to position the cutterbar above the ground a minimum cutterbar distance when the lower skid margin engages the ground, said minimum cutter distance being about 60-90 millimeters.

3. The harvesting header as claimed in claim 2, said skid angle ranging from about 6-10 degrees.

4. The harvesting header as claimed in claim 1, said skid angle being greater than the ground angle.

5. The harvesting header as claimed in claim 4, said skid angle being different from the ground angle by about thirty degrees to about forty degrees.

6. The harvesting header as claimed in claim 1, wherein:
said cutterbar assembly including a flexible cutterbar supported on each of the skids at a support location;
said forward and aft portions of the skid surface cooperating to position the support location at a vertical skid dimension above the ground when the lower skid margin engages the ground;
said skid presenting a longitudinal skid dimension measured in a fore-and-aft direction between the support location and the lower skid margin, wherein the fore-and-aft direction is generally perpendicular to the vertical skid dimension;
said skid being configured so that a ratio of vertical skid dimension to longitudinal skid dimension ranges from about 1:2 to about 1:1.

7. The harvesting header as claimed in claim 1, each of said skids including a skid plate with a cutterbar-supporting forward section and a ground-engaging aft section that define the respective forward and aft portions of the skid surface, said forward and aft sections of the skid plate being joined at a bend.

8. The harvesting header as claimed in claim 7, said forward section of the skid plate being located forwardly of the draper belt.

9. The harvesting header as claimed in claim 7, each of said skids including reinforcement structure attached to and extending longitudinally to interconnect the forward and aft sections of the skid plate to restrict relative flexing between the forward and aft sections.

10. The harvesting header as claimed in claim 9, said reinforcement structure including a fore-and-aft rib extending between the forward and aft sections.

11. The harvesting header as claimed in claim 10 further comprising a plurality of laterally spaced apart pivotable support arms being attached to and cooperatively supporting the flexible cutterbar assembly, each of said support arms being pivotally coupled to the frame for swinging movement about a laterally extending axis, said reinforcement structure including a mounting bracket attached to the forward section, said mounting bracket being attached to a respective one of the support arms so as to be swingable with the one support arm about the laterally extending axis.

12. The harvesting header as claimed in claim 1, said draper belt being supported on the header frame to flex with the cutterbar assembly as changes in terrain are encountered.

13. The harvesting header as claimed in claim 12; and
a plurality of laterally spaced apart pivotable support arms being attached to and cooperatively supporting the flexible cutterbar assembly;
each of said support arms being pivotally coupled to the frame for swinging movement about a laterally extending axis;
said draper belt being carried on multiple ones of the support arms so as to flex with the cutterbar assembly.

14. The harvesting header as claimed in claim 1, wherein the run support panels are spaced entirely rearwardly of a leading edge of the lower run of the draper belt so that any crop residue from the draper belt is restricted from falling onto the run support panels.

15. The harvesting header as claimed in claim 1, wherein each lower run support platform comprises a top, forward legs, and aft legs, with the forward and aft legs being attached to and depending from the top.

16. The harvesting header as claimed in claim 1, wherein the lower run support platform is attached to a corresponding skid such that lower ends of forward and aft legs attach to the aft portion of the skid so that the legs forward and aft legs project upwardly and rearwardly from the aft portion.

* * * * *